United States Patent
Tailor et al.

(10) Patent No.: US 6,355,318 B1
(45) Date of Patent: Mar. 12, 2002

(54) HEAT SHRINKABLE MEMBER

(75) Inventors: Dilip K. Tailor, Brampton; Michael Verge, Markham; Robert E. Steele, Richmond Hill; John H. Oliver, Huntsville; Jeffery A. D. State, Etobicoke; Sean A. Haberer, Thornhill, all of (CA)

(73) Assignee: Shawcor Ltd., Toronto (CA)

( * ) Notice: Subject to any disclaimer, the term of this patent is extended or adjusted under 35 U.S.C. 154(b) by 0 days.

(21) Appl. No.: 09/311,145

(22) Filed: May 13, 1999

Related U.S. Application Data

(63) Continuation-in-part of application No. PCT/CA97/00861, filed on Nov. 14, 1997.

(30) Foreign Application Priority Data

Nov. 14, 1996 (GB) ............................................. 9623748

(51) Int. Cl.$^7$ ........................... H01R 4/01; B65B 53/02; B29C 61/02
(52) U.S. Cl. .............. 428/34.9; 174/84 R; 174/DIG. 8; 138/109; 138/118.1; 138/137; 138/141; 156/84; 156/85; 156/86; 264/230; 264/342 R
(58) Field of Search ............................. 428/34.9, 35.1, 428/36.9, 36.91; 174/DIG. 8, 84 R; 138/170, 104, 109, 118.1, 137, 141; 156/84–86; 264/230, 257, 342 R

(56) References Cited

U.S. PATENT DOCUMENTS

| | | | |
|---|---|---|---|
| 3,519,728 A | * 7/1970 | Gillemot | 174/84 R |
| 3,554,999 A | * 1/1971 | Shaw et al. | 264/514 |
| 3,985,950 A | * 10/1976 | Maltz | 174/88 C |
| 4,487,994 A | * 12/1984 | Bahder | 174/73.1 |
| 4,514,241 A | 4/1985 | Maukola | 156/79 |
| 4,709,948 A | 12/1987 | Archer et al. | 156/86 |
| 4,728,550 A | * 3/1988 | Beersel et al. | 428/34.9 |
| 4,885,194 A | * 12/1989 | Tight, Jr. et al. | 428/34.9 |
| 4,896,000 A | * 1/1990 | Procter et al. | 174/74 R |
| 4,896,904 A | * 1/1990 | Gadsden et al. | 285/381.5 |
| 5,006,286 A | * 4/1991 | Dery et al. | 174/84 R |
| 5,134,000 A | * 7/1992 | Smythe et al. | 428/34.9 |
| 5,662,974 A | * 9/1997 | Andrenacci et al. | 428/36.9 |
| 5,753,861 A | * 5/1998 | Hansen et al. | 174/93 |
| 5,755,465 A | * 5/1998 | Stewart, Jr. et al. | 285/381.5 |
| 5,786,053 A | * 7/1998 | Andrenacci et al. | 428/36.9 |

FOREIGN PATENT DOCUMENTS

| | | |
|---|---|---|
| DE | 2320273 | * 11/1974 |
| EP | 038 051 | * 4/1981 |
| EP | 0038051 | 10/1981 |
| EP | 0079702 | 5/1983 |
| EP | 0100170 | 2/1984 |
| EP | 0114660 | 8/1984 |
| EP | 0119073 | 9/1984 |
| EP | 0188363 | 7/1986 |
| EP | 0414414 | 2/1991 |
| EP | 0513999 | 11/1992 |
| GB | 1245119 | 9/1971 |
| GB | 1470049 | 4/1977 |
| GB | 2046032 | 11/1980 |
| GB | 2184804 | 7/1987 |
| WO | 96/38288 | 12/1996 |

* cited by examiner

Primary Examiner—Rena L. Dye
(74) Attorney, Agent, or Firm—Ridout & Maybee LLP

(57) ABSTRACT

A casing member for forming a connection between tubular sections. The member has heat shrinkable end portions, for connecting on respective adjacent end surfaces of the tubular sections adjacent the joint, and a middle portion for spanning between the end surfaces of the tubular sections. The end portions are formed integrally with at least a portion of the middle portion and have a zone that has a relatively small wall thickness while the middle portion having a relatively large wall thickness. This member may be made by heat shrinking a sleeve on an inner core on a mandrel or by uniting opposed ends of a heat shrink sheet having one or more auxiliary layers bonded to it. The properties of the core or auxiliary layer or layers may be tailored to provide desired properties or capabilities.

24 Claims, 10 Drawing Sheets

HEAT SHRINKABLE MEMBER

This application is a continuation-in-part of patent application Ser. No. PCT/CA97/00861 filed Nov. 14, 1997 published as WO98/21517.

The present invention relates to at least partially heat shrinkable members for forming a connection between tubular sections.

Such members may be used for connecting a variety of tubular sections together. For example, they may be used as coupling sleeves for joining plastic tubes or pipes.

A further example of the use of such members is in the formation of casings for preinsulated pipe joints.

Preinsulated pipelines for carrying fluids at non-ambient temperatures typically consist of a service or carrier pipe, covered with insulating material such as foam. The insulating material is generally encased within a jacket which may for example be made from a polymeric material, such as high density polyethylene, or a metal such as steel or aluminum. The pre-insulated pipes are connected in the field by welding the service pipe which extends beyond the insulation at each end, and then insulating and encasing the joint.

A suitable casing on the joint is a critical component of the pipeline, as it must provide a water-tight connection to the rest of the pipe and mechanical protection to the insulation. It is often desirable to employ the joint casing to facilitate the formation of foam insulation in the joint, in which case the casing serves as a mould into which the foam components are introduced usually through a foam hole in the casing side wall. In order that the casing continues to protect the joint from water ingress, it is necessary that the casing itself is not damaged, or dislocated from the joint area, or undergo distortion so that a path is created for water ingress to occur.

It has been proposed to provide heat shrinkable casing members. With some known structures of which the applicant is aware the extent of mechanical protection offered to the joint is not as great as may be considered desirable and with others the casings are not readily conformable and as easy to shrink down onto the pipe jacketing as may be desired. Further with some known structures there have been difficulties in welding on a plug to close the foam hole in the side of the casing. Further, the procedures for manufacturing these casing members have been excessively laborious and expensive. A further difficulty with known structures is that when the end portions of the casing are heated, for the purpose of shrinking them down and uniting them with the pipe jacketing, there is a tendency for portions of the casing adjacent the cavity to shrink inwardly into the cavity, thereby deforming the casing inwardly. As a result, the foam subsequently formed within the deformed casing has insufficient thickness in the inwardly deformed areas, and can present problems of insufficient protection or of excessive heat transfer through the insufficiently insulated areas. It has been proposed in U.S. Pat. No. 4,514,241 issued Apr. 30, 1985 (Maukola) to employ a coil shaped support member to preserve the desired contour of the casing during the shrinking process, but this is inconvenient and expensive because of the additional costs and inventory requirements of the coil system.

In one aspect, the present invention provides a casing member for forming a connection between tubular sections, the member having heat shrinkable end portions, for connecting on respective adjacent end surfaces of the tubular sections adjacent the joint, and a middle portion for spanning between the end surfaces of the tubular sections, the end portions formed integrally with at least a portion of the middle portion and comprising a zone having a relatively small wall thickness and the middle portion having a relatively large wall thickness.

With this arrangement, the thick middle portion, which maintains the form of a self-supporting layer at the temperature at which the end portions commence heat shrinking, and does not melt or flow at that temperature, provides excellent mechanical protection while the relatively thin heat shrinkable end portions facilitate installation since they readily conform and shrink down onto the end surfaces of the adjacent tubular sections. The said zones of the end portions tend to shrink preferentially and the relatively thick middle portion, even in the case in which it is heat shrinkable, is less readily heated to a point at which it shrinks and deforms into the cavity.

In the structure of the invention, the middle portion may be but is not necessarily heat shrinkable and can be of a wall thickness that provides a preferred degree of mechanical strength or that imparts some other desired property to the joint, while the thin zones of the end portions may be substantially thinner.

The end portions of the casing member of the invention may be of substantially uniform thickness throughout or they may have a wall portion that decreases laterally outwardly from the middle portion toward the outer ends or sides of the member. The profile may decrease in thickness smoothly or in a stepped fashion.

The wall thickness of the thinner zones (or of the thickest portions of the thinner zones in the case in which the thickness varies in the direction between the middle portion and the outer ends or sides of the member) is preferably no more than 95% the thickness of the middle portion, more preferably no more than 90%, still more preferably no more than 80%, and still more preferably no more than 70%, the thickness of the middle portion.

Desirably, the middle portion is of substantially uniform wall thickness throughout. In the event the middle portion is of varying wall thickness, reference to the thickness of the thinner zones relative to the thickness of the middle portion refer to the thickness of the thinnest portion of the middle portion.

The casing member of the invention may be formed by various techniques, for example by blow molding or rotational molding of suitable plastics materials, crosslinking, expansion and cooling to impart a heat shrink property, these methods being in themselves well known and well understood by one of ordinary skill in the art.

In a highly preferred form, however, the casing member is formed as a composite member.

In a second aspect, the invention provides a method of forming a composite sleeve member having heat shrinkable end portions comprising disposing an inner covering member on a mandrel, disposing around the inner member and mandrel a sleeve formed from a sheet that is heat shrinkable in the circumferential direction, edge portions of the sheet being bonded at an overlap portion, said sleeve extending beyond either end of the inner member, shrinking the sleeve to conform to the inner member and mandrel, bonding the shrunk sleeve to the inner member to form a composite sleeve member, and removing the composite sleeve member from the mandrel.

The inner covering member may be, for example, a tubular member, such as an extruded tube or may be a sheet wrapped around the mandrel.

This method allows the production of casing members having relatively thin heat shrinkable end portions with consistent quality and at low capital and manufacturing costs.

It further has the advantage that it allows the nature and properties of the inner member to be tailored having regard to or independently of the nature and properties of the outer heat shrink sleeve in order to provide the composite sleeve with properties or capabilities that adapt it for particular end uses.

For example, the inner member may or may not be heat shrinkable. The inner material may, for example, be formed from fibre reinforced polymer in order to obtain a higher flexural modulus. This allows the thickness of the member to be reduced without comprising the mechanical integrity of the casing member, and reduces the weight of the product.

The inner member may be a sleeve of sheet metal, such as galvanized aluminium, galvanized sheet steel or the like, in order to provide a light weight structure having mechanical rigidity. The inner member may be constructed from a combination of various materials, for example plastics and metals combined, for example in a multilayer structure.

Further, the inner member may be formed from transparent material, such as transparent polymers, and the outer sleeve may likewise be formed from transparent or semi-transparent polymers, to provide a transparent or semi-transparent casing through which it is possible to visually detect defects such as air voids that may be present in a foam formed within the casing. When such defects are detected, a repair may be carried out by drilling a hole and filling it with more foam.

In a particularly advantageous form, the inner member comprises a plastics material that is uncrosslinked, or is crosslinked to a lesser extent than the material of the sleeve, in order to facilitate heat fusing of a foam hole plug to the casing in service.

In a further modification, the casing member may be formed as a composite sleeve member made by laminating first and second layers together, at least one of these layers being heat shrinkable, forming the laminate into a sleeve, and bonding overlapped edges of the laminate together.

In a third aspect, the present invention provides a method of forming a composite sleeve member having heat shrinkable end portions comprising providing a first layer that is heat shrinkable in a heat shrink direction, laminating a second layer to the first layer, the second layer having sides disposed inwardly from the margins of the first layer, and bonding, at an overlap portion, edge portions of the laminate that are spaced apart in the heat shrink direction.

Similarly to the method described earlier, this method provides the advantage that it allows the properties of the first and second layers to be tailored to provide particular properties or capabilities for the resultant composite sleeve member. For example, the second layer, which will usually form the inner or core layer of the composite sleeve, but may in some cases form the outer layer in the sleeve structure, may for example comprise a fibre reinforced plastics material or may be uncrosslinked or crosslinked to a lesser extent than the first layer.

In the latter case, it may be preferred that the relatively uncrosslinked second layer be formed as the outer layer of the composite sleeve, in order to facilitate welding of a plastics material plug to a foam hole formed through the sleeve member in service as an insulated joint casing.

In a further aspect, the present invention provides a casing member for forming a connection between tubular sections comprising a tubular sleeve of which at least end zones are heat shrinkable, said sleeve comprising first and second plastics material layers bonded together, wherein the second layer is relatively uncrosslinked as compared with the first layer, and said sleeve having a hole through said first and second layers for introducing a liquid precursor of a foam composition to the interior of the sleeve.

As noted above, this casing member provides particular advantages of ease of welding on a plug for sealing a foam fill hole on the casing member in service.

In the preferred form, the heat shrinkable elements employed in the casing members and methods of the invention comprise cross-linked plastic materials, for example organic polymers or elastomers or mixtures thereof. Examples of suitable plastics material usable for the heat shrinkable members, and for the uncrosslinked or relatively uncrosslinked members, as well as for non-heat shrinkable or dimensionally heat stable components, are well known to those skilled in the art and need not be discussed in detail herein. Further, the methods of cross-linking the plastics materials, and the degrees of cross-linking required to provide sufficient resistance to melting to allow the cross-linked polymers to be readily heated with torch flames or the like for a period sufficient to induce shrinking are well known to those skilled in the art and need not be described in detail. Likewise, the techniques that are employed for heating and expanding or stretching or cooling suitable materials in order to impart to them a heat shrink property are conventional and well known to those of skill in the art and again need not be described in detail.

For further details of suitable plastics material compositions and of crosslinking and of stretching and expansion techniques for imparting a heat shrink property, reference may be made to U.S. Pat. No. 3,297,819 (Wetmore); U.S. Pat. No. 4,200,676 (Caponigro) and U.S. Pat. No. 4,472,468 (Tailor et al).

BRIEF DESCRIPTION OF THE DRAWINGS

Examples of casing members and methods in accordance with the invention will now be described in more detail, by way of example only, with reference to the accompanying drawings.

Referring to the drawings, FIGS. 1 and 2 show a casing member in the form of a one piece circumferentially shrinkable tubular sleeve 10. The sleeve 10 is generally cylindrical, and has relatively thin walled tubular end portions 11 that are circumferentially heat shrinkable and a relatively thick wall tubular middle portion 12 that may be but is not necessarily circumferentially heat shrinkable.

Figure 1:
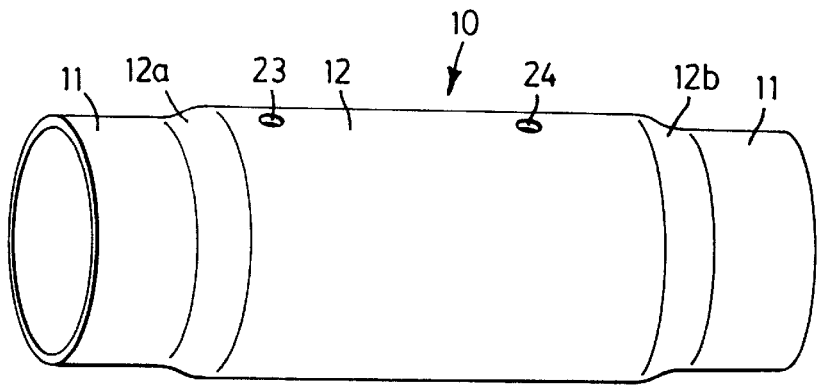
FIG. 1 is a perspective view of a casing member in accordance with the invention.
Figure 2:
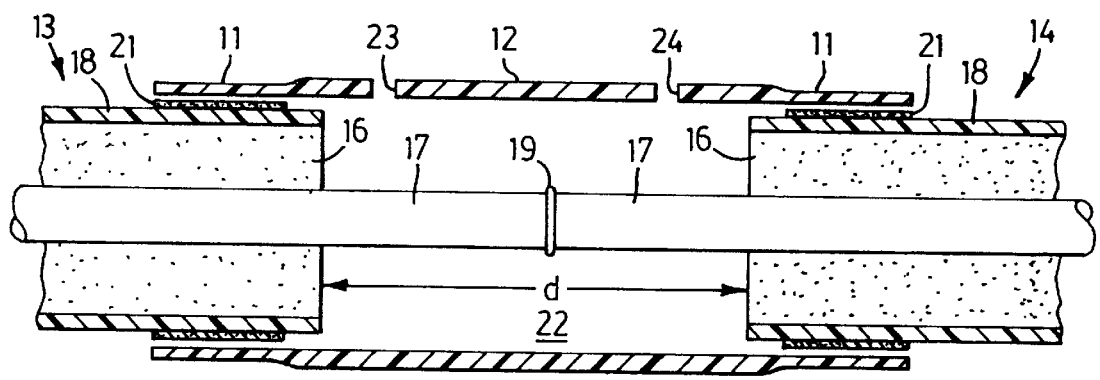
FIG. 2 is a side view, partially in section, through the member of FIG. 1 used as a casing in forming a preinsulated pipeline joint.
Figure 3:
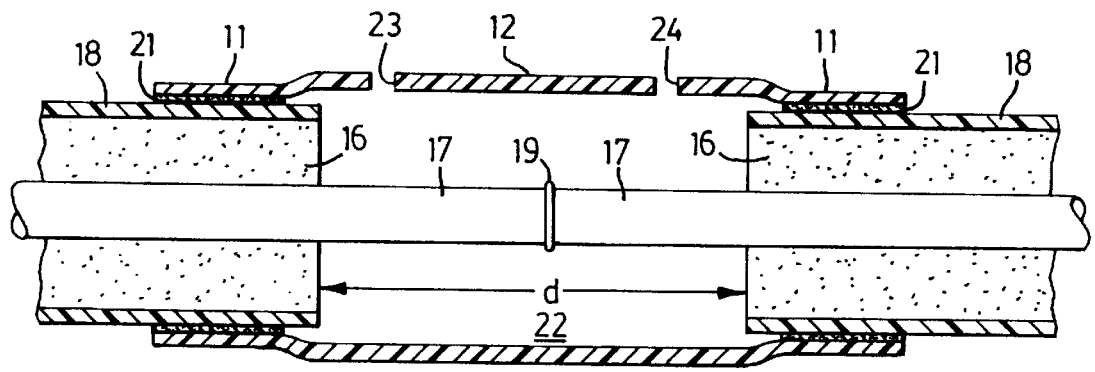
FIG. 3 is a view similar to FIG. 2 showing the ends of the casing shrunk down.

In the example of FIGS. 1 to 3, the sleeve 10 is initially of substantially constant inside diameter and the outside diameter increases from the thin walled end portions 11 to the middle portion 12 along generally conically flaring transitional portions 12a and 12b.

FIGS. 2 and 3 show the sleeve 10 of FIG. 1 employed in forming a joint between two preinsulated pipe sections 13 and 14. Each pipe section 13 and 14 comprises insulation material, for example polyurethane foam 16, in the form of a cylinder disposed concentrically around a metal, for example steel, pipe 17. The insulation 16 is jacketed within a cylindrical pipe jacket 18 which may for example be a plastics material, for example high density polyethylene, or a metal such as steel or aluminium.

In use, before uniting the pipe sections 13 and 14, the sleeve 10 may be slid over the end of one of the sections 13 and 14 and shifted rearwardly from the end sufficiently to reveal the bare end of the pipe 17. As manufactured, the pipe sections have the jacketing 18 and insulation 16 terminating short of the ends of the pipe 17, to expose end portions of the pipe 17 for welding.

The juxtaposed ends of the pipe 17 are then welded together at a weld 19.

Preferably, a functional material 21 that facilitates forming a water tight seal is provided between the end portions 11 and the jacketing 18. The functional material may, for example, comprise a sealant, mastic or adhesive applied either to the external circumference of the jacketing 18 or to the internal surface of the end portions 11. For example, as shown, the functional material 21 may comprise an adhesive applied to the exterior of the jacketing 18. For example, it may comprise a hot melt adhesive layer that will become molten when the end portions 11 are heated to shrink them.

In the preferred form, the sleeve 10 is positioned so that the end portions 11 overlie portions of the jacket 18 offset a small distance inwardly from the ends of the insulation 16. Preferably, the length of the thick middle portion 12 is such that it is slightly longer than the length d of the cavity formed between the ends of the insulation 16 when the pipes 17 are welded together, such that each end of the thick middle portion 12 overlaps by 25 to 50 mm over the ends of the jackets 18.

The thin end portions 11 are heated in a conventional manner, for example with a gas torch flame to cause them to shrink and to activate the hot melt adhesive or other functional material 21 so that the shrunk down ends 11 grip tightly on the functional material 21 and exert a hoop stress ensuring a water tight seal between the ends 11 and the casing 18. In the preferred form, the end portions 11 are relatively thin such that the heating applied to the end portions 11 in the conventional manner, and that is ample to shrink the portions 11 and activate the functional material 21, can be applied in a relatively short time span. There is then little opportunity for conduction of heat into the adjacent marginal portions of the relatively thick middle portion 12. Further, once the heating has terminated, there is less residual heat in the heated end portions 11 or in the materials underlying them and therefore there is less tendency for substantial residual heat to be conducted into the adjacent middle portion 12. Further, it has been found that when the wall thickness of a shrinkable substrate is high, the response times to heat-induced shrinking is slow and a considerably greater length of time elapses before shrinking commences. As a result, the thinner end portions will shrink preferentially even when the middle and end portions are equally heat shrinkable and are exposed to the similar heating conditions, for example when they are exposed to similar heat flux from an external heating source, such as a torch or the like, for similar periods of time.

While some small degree of shrinkage of the transition portions 12a and 12b and of the immediately adjacent marginal portion of the thick portion 12 overlying the jacket 18 may occur, with the structure of the invention even where the middle portion is heat shrinkable it is a relatively simple matter for the installer to confine the heating and shrinkage generally to the end portions 11 so that shrinkage of the middle portion 12 inwardly into the cavity between the ends of the insulation 16 and jacketing 18 does not occur.

In use, usually a liquid precursor of a foam composition is poured into the cavity 22 through a hole 23 which may be provided in the sleeve 10 as manufactured, or may be drilled in the middle portion 12 before installation on the pipe joint. A hole 24 may be drilled before or after installation of the sleeve 10 on the joint, and acts as a vent for air to escape when the foam expands. The foam precursor is allowed to foam and set. The holes 23 and 24 may then be plugged to render them water tight in the conventional manner.

In the case in which the middle portion 12 is heat shrinkable and the tubular sleeve 10 is applied after formation of foam insulation in the cavity 22, the above procedure is followed, except after positioning the sleeve 10 and effecting the weld 19, a half shell or similar mold is positioned around the cavity, the foam is formed and the half shell mould removed. After shrinking down one end 11, the middle portion 12 is deliberately heated to effect shrinkage of it onto the cylindrical surface of the foam insulation filling the cavity 12 while leaving the other end portion 11 unshrunk to allow air to escape. The other end portion 11 is then shrunk down. In such a case, the sleeve 10 would not ordinarily have or be formed with pour and vent holes 23 and 24.

Where the tubular sleeve is applied prior to foaming a joint between insulated pipe sections having a jacket, it is ordinarily desirable that the middle portion 12 have a wall thickness similar to the wall thickness of the jacket 18 so that the tubular sleeve casing offers mechanical protection to the joint foam equivalent to that provided by the pipe jacket 18 to the pipe foam 16. The thickness of the middle portion 12 of the sleeve 10 may however differ by as much as 25% from the jacket thickness 18 for a given pipe size while still providing adequate mechanical protection. Usually, the larger the diameter of the pipe section such as pipe 13 or 14, the greater is the thickness of the jacket 18 provided by the manufacturer to offer mechanical protection for the foamed insulation 16. Preferably, the wall thickness of the middle portion 12 of the heat shrinkable member of the invention is in the range 1.8 to 12.5 mm.

In one preferred form of the member of the present invention, the thickness of the middle portion 12 is less than 5 mm, for example is 1.8 to 5 mm. This is particularly advantageous in the case in which foam insulation for the joint is formed before the joint casing is applied. It has been found that, with the usual cross linked plastics material, and the usual modes of heating, the prolonged heating required for effecting shrinkage of a wall thickness over about 5 mm is so great that the plastics material tends to char or degrade to an undesirable extent.

Desirably, the wall thickness of the end portions 11 of the member of the invention is no more than 95% the thickness of the middle portion 12. If the thickness differential between the end portion 11 and middle portion 12 is insufficient, there may be insufficient tendency for the end portions 11 to shrink preferentially and there may be a tendency for residual heat remaining after the shrinking of the end portions 11 has been completed to cause shrinkage of areas of the middle portion 12 into the cavity. Further, it is desirable that the thickness of the end portions should be sufficiently small that the end portions will readily shrink uniformly when heating is applied to them within a reasonable period of time without degradation of the heat shrinkable material occurring. More preferably, the wall thickness of the end portions 11 is no more than 90%, still more preferably 80% and even more preferably 70% the wall thickness of the middle portion 12, and is in the range of 0.5 to 6 mm, more preferably is 1 to 4 mm.

If the thickness differential between the end and middle portions is excessively large, the end portions 11 may be of insufficient thickness to resist foam pressures and temperatures. Where post-foaming is conducted, the internal pressure can exceed 0.5 bar and the temperatures can exceed 60° C. If the end portions 11 of the casing are excessively thin, they may have insufficient strength to withstand these foam pressures and temperatures without elongating and ballooning. Further, if the end portions 11 are excessively thin, they may provide insufficient hoop stresses on shrinking to provide an effective seal against the ingress of water and other elements.

Where the middle portion 12 is very thick, for example in the case of a sleeve 10 adapted to be applied to large diameter pipes, the thickness differential between the end portion 11 and the middle portion 12 may be large. Preferably, the wall thickness of the end portions 11 is at least 5%, still more preferably at least 10% the thickness of the middle portion 12.

Preferably, the end portions 11 of the sleeve 10, and the middle portion 12 in the case in which the middle portion is heat shrinkable, exhibit on heating to a fully shrunk condition a degree of circumferential shrinkage of 5 to 60%, based on the circumference of the unshrunk sleeve.

One advantage of the form of sleeve of FIGS. 1 and 2, wherein the sleeve 10 has a varying outside diameter, is that the transition portions 12a and 12b provide a visual demarcation line, indicating to the installer the limits of the area to which heat is applied.

Figure 4:
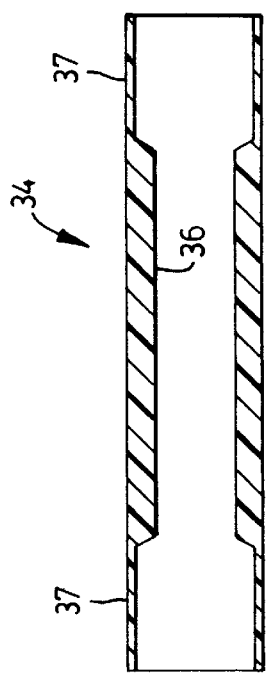
FIGS. 4 and 5 are longitudinal cross sections through further forms of heat shrinkable member in accordance with the invention.

However the sleeve as described above in detail with reference to FIGS. 1 to 3 may be modified in that it has a constant outside diameter, as indicated for the sleeve 34 in FIG. 4 having a thick-walled middle portion 36 and thin end portions 37, wherein the inside diameter of the sleeve varies as seen in FIG. 4. The sleeve 34, which in all other respects may be similar to the sleeve 10 described above, offers the advantage that the inner surfaces of the inwardly recessed end portions 37 can have a layer of a functional material, for example an adhesive, applied to them without reducing the internal diameter of the sleeve. This arrangement therefore in some circumstances allows the use of a sleeve of somewhat smaller outside diameter than the arrangement of FIGS. 1 and 2. A circumferential line may be printed on the outside of the sleeve to indicate the extent of each end portion 37.

Figure 5:
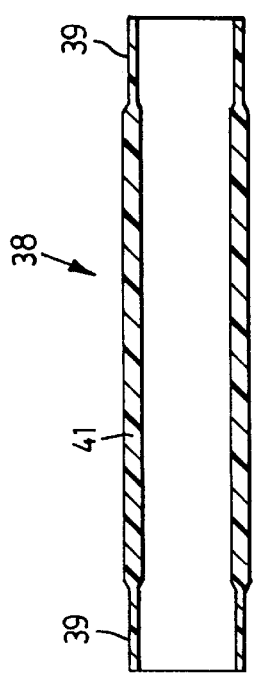

In a further modification, as seen in FIG. 5, a sleeve 38 has thin walled end portions 39 the surfaces of which are offset inwardly with respect to both the inner and outer surfaces of a relatively thick-walled middle portion 41. This sleeve provides a visual and non-erasable demarcation of the end portions as well as accommodating a thin layer of functional material on the inner circumference of the end portions 39.

The wall thickness of the end portions 11 of the heat shrinkable members of the invention may be substantially uniform at all cross sections, or the thickness may vary. For example, each end portion may have a section or sections that have a wall thickness less than the wall thickness of the middle portion. For example each end portion may decrease in thickness laterally outwardly from the middle portion toward the outer ends or sides of the member. This variation may be smoothly progressive or it may be stepped in discrete increments. Examples of profiles of varying thickness are shown in longitudinal cross section of end portions 11a, 11b and 11c, respectively, in FIGS. 6A to 6C.

Figure 6A:
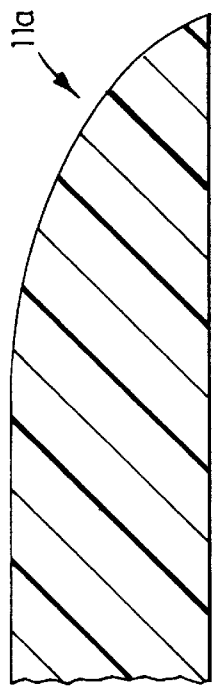
FIGS. 6A, 6B and 6C are partial longitudinal cross sectional views showing the profile of the end portions of further forms of heat shrinkable member in accordance with the invention.
Figure 6B:
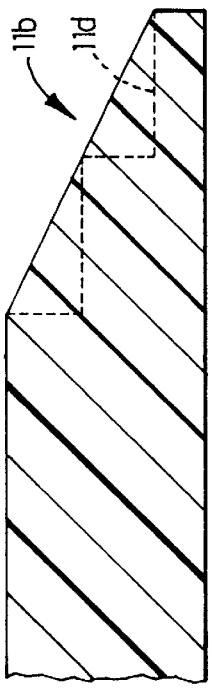
Figure 6C:
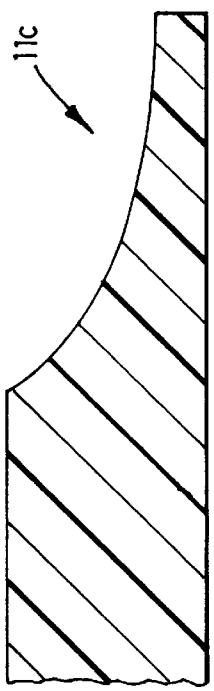

FIG. 6B shows a cross section that varies linearly in thickness while in FIGS. 6A and 6C the variation is geometric to provide convexly arcuate and concavely arcuate profiles, respectively. A stepped configuration is shown in broken lines at lid in FIG. 6B. These profiles may be formed on the inner or outer surfaces of the end portions of the sleeves, or on both the inner and outer surfaces.

Preferably each zone of relatively small thickness, for example the thin end portions 11 in the example of FIG. 1, extend 5 to 35%, preferably 10 to 30%, and more preferably 15 to 25%, the length of the member preferably such as member 10.

It may be noted that the casing members of the invention preferably have a relatively high ratio of diameter to wall thickness such as is typical of sleeving, as that term is understood by those of ordinary skill in the art. For example preferably the ratio of the wall thickness of the middle portion, for example portion 12, to the diameter of the middle portion, is in the range from 5:1 to 300:1, preferably 7:1 to 210:1, more preferably 10:1 to 150:1.

various procedures may be employed for manufacturing the casing members such as those described above and having their middle portions heat shrinkable.

For example, the sleeves 10, 34 and 38 may be formed by extruding a tube, and compression forming the end sections to a thinner cross section, followed by cross linking, expansion and cooling in the conventional manner. Alternatively, a tube of the configuration shown in FIGS. 1 and 2, 4 or 4 may be formed by rotational molding or blow molding, and is then cross linked, expanded and cooled to yield a heat shrinkable product using procedures that are in themselves well known to those skilled in the art.

Figure 7:
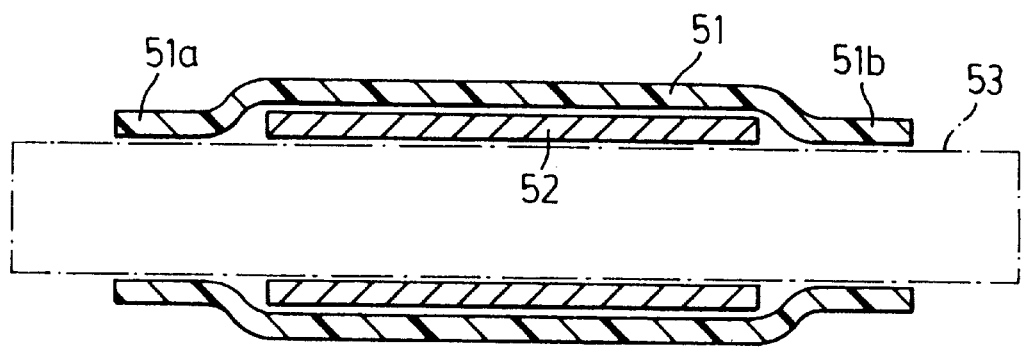
FIG. 7 is a somewhat schematic longitudinal cross-section through a preferred form of casing member in accordance with the invention.

In the preferred form, a casing member having the general configuration of the sleeve 10 shown in FIGS. 1 to 3 is formed as a composite sleeve by a procedure as illustrated somewhat schematically in FIG. 7, wherein a heat shrinkable outer layer or sleeve 51 is heat shrunk onto an inner layer or core 52 disposed on a mandrel indicated by broken lines at 53, and the layers 51 and 52 are bonded together, for example by fusion or welding or by a conventional adhesive agent.

In a typical example, after placing the inner core 52 on the mandrel 53 and positioning the wider outer heat shrinkable sleeve 51 over it, the assembly is subjected to heat, for example by placing it in an oven at 150° C., above the melting point of the layers 51 and 52 for a period of 10 to 30 minutes depending on the thickness and size. The outer sleeve 51 shrinks onto the inner core 52 and assumes the shape and size of the mandrel. The heat melts the inner core 52, which also takes on the contours of the mandrel 53. The heat and resultant softening of the layers 51 and 52, as well as the pressure from the shrinking outer layer 51 facilitate direct fusion of the layers 51 and 52 together or promote good adhesion, when an adhesive medium is used between the inner and outer layers 51 and 52. The resulting composite sleeve is then cooled and removed from the mandrel 53. Examples of suitable adhesive media that may be used between layers 51 and 52 are well known to those skilled in the art. For example a high temperature adhesive such as a polyolefin copolymer adhesive may be used.

The dimensions and initial degree of heat shrinkage of the sleeve 51 are such that the end portions 51a and 51b extending beyond the core 52 retain residual heat shrinkability. In the case in which a sleeve with a heat shrinkable middle portion is desired, the inner core 52 may similarly have initial dimensions and degree of heat shrinkability such that it retains heat shrinkability in the finished product.

Figure 8:
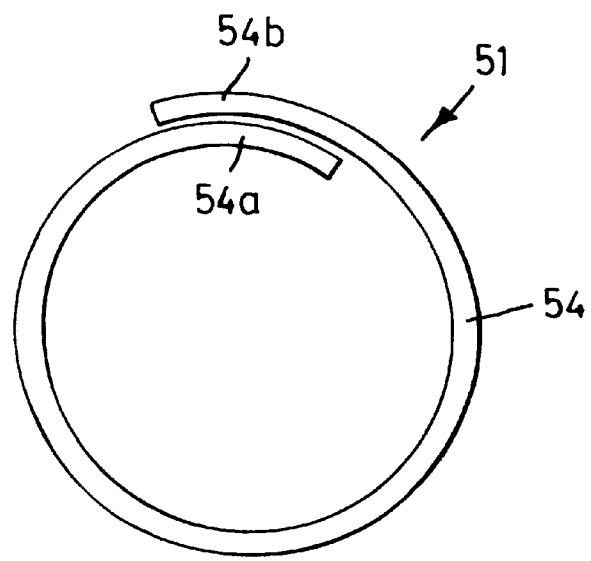
FIG. 8 shows a transverse cross-section through a wrap-around sleeve.

In the preferred form, the sleeve constituting the outer layer 51 is formed from a sheet of heat shrinkable material 54, as seen in FIG. 8, of which edges 54a and 54b that are opposed in the heat shrink direction are overlapped and bonded together.

Figure 9A:
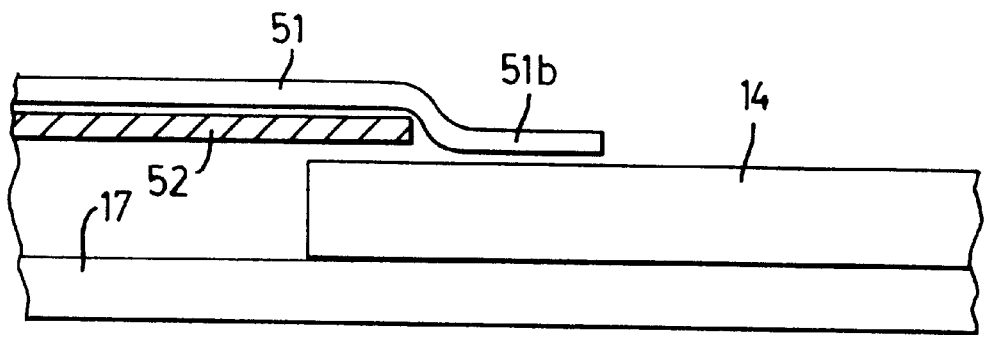
FIGS. 9A and 9B are partial side views, partially in section illustrating application of a heat shrinkable end portion of a casing member at a preinsulated pipeline joint.
Figure 9B:
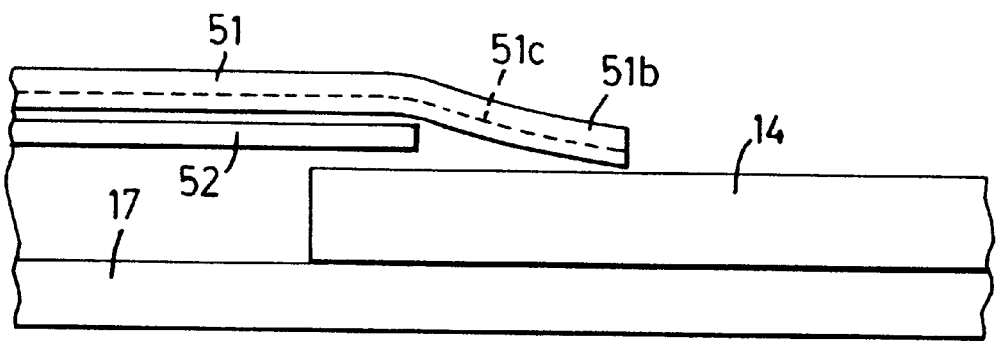

It has been found that, if the thickness of the sleeve at the overlap portion as indicated by a broken line 51c in FIG. 9B is excessively thick, the resulting casing member may not conform well at its end portions 51b to the exterior surface of the pipe jacket 14, as indicated in FIG. 9A, but instead, during the shrinking process by application of heat to the end portions 51b, the end portions may not shrink down and conform to the substrate 14, but rather may tend to form a bridge, as seen in FIG. 9B.

In a preferred form, in order to avoid or reduce the tendency for bridging, it is desirable that the thickness of the material at the overlap portion should not be greater than 80%, more preferably 50%, still more preferably 30%, and still more preferably 15%, thicker than the thickness of the remainder of the sheet 51.

In the preferred form, the edge portions to be joined together are reduced in thickness, for example by abrading or machining them before subjecting them to the joining operation.

Figure 10A:
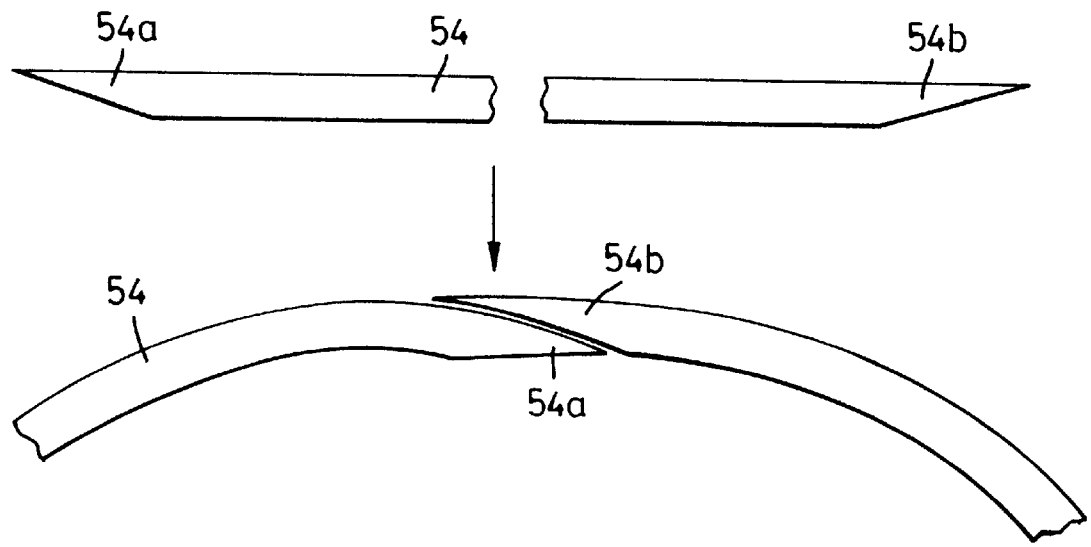
FIGS. 10A and 10B are partial transverse cross-sections showing preferred forms of bonding overlap.
Figure 10B:
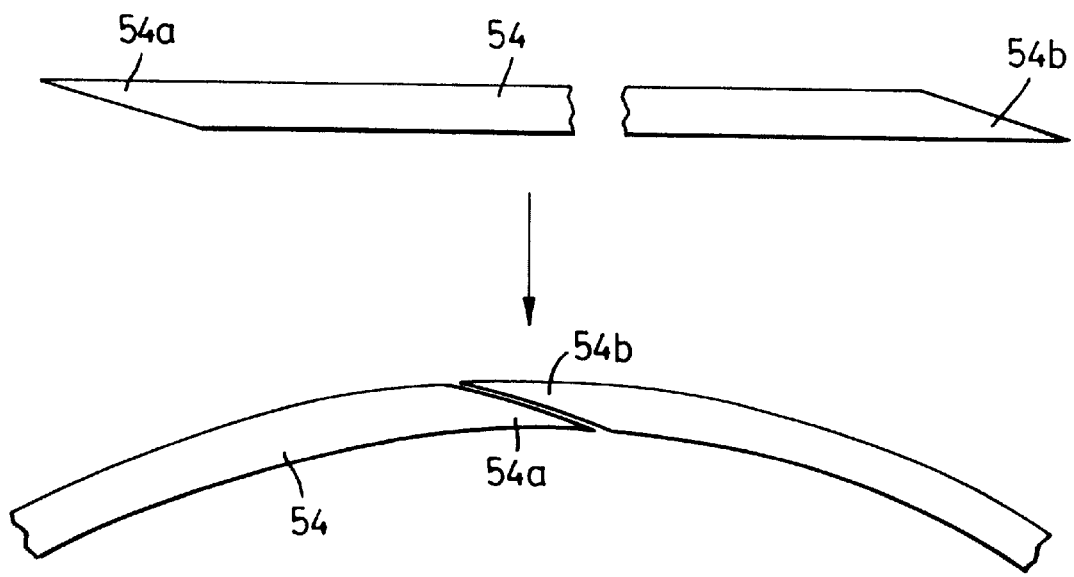

Preferably, as seen in FIGS. 10A and 10B, the edges 54a and 54b are chamfered or tapered. The chamfered surfaces may each face towards the same side of the sheet 54, as seen in FIG. 10A or may face oppositely, as seen in FIG. 10B. The overlapped edges may be joined together using conventional welding or fusing techniques, for example by application of heat and pressure, ultrasonic welding or frictional welding. It is important that the length of the overlap is long enough to withstand the shrinking forces in the sheet, and these depend on the type of material, for example whether it is a lower or a high density polyethylene, the degree of crosslinking, the amount of stretch and the tube diameter. Merely by way of example, it may be mentioned that in the case of a high density polyethylene casing with a diameter of 160 mm, an end zone thickness of 2 mm and a degree of shrinkage of 23% based on the length of the unshrunk sheet, the extent of overlap should preferably be in the range 25 to 50 mm when the degree of crosslinking of the sheet is in the range about 50 to about 65%. All degrees of crosslinking referred to herein are percentages by weight determined by the gel fraction method.

Figure 11A:
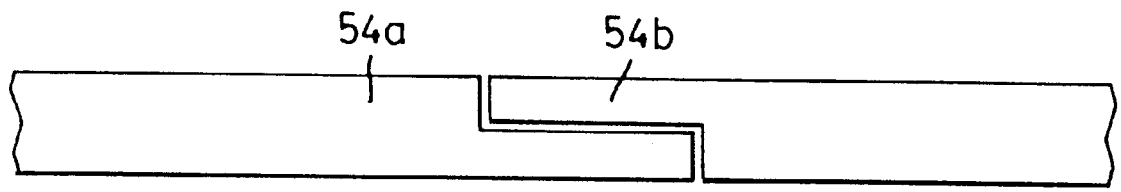
FIGS. 11A, 11B, 11C and 11D are partial transverse cross-sections through alternative forms of bonding overlap.
Figure 11B:
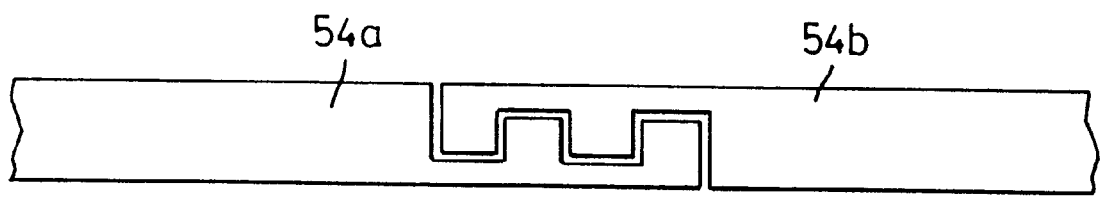
Figure 11C:
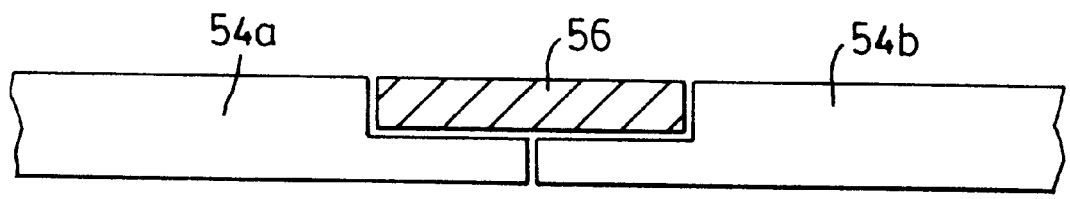

Other configurations of thin edge portions may of course be employed. For example, as seen in FIG. 11A, the edge portions 54a and 54b may be complimentary rabbeted or grooved as seen in FIG. 11B. As seen in FIG. 11C, the edge portions may be provided with aligned rabbets or edge grooves to provide a channel in which a strip 56 fusible with and compatible with the polymer of the sheet 54 is applied.

Figure 11D:
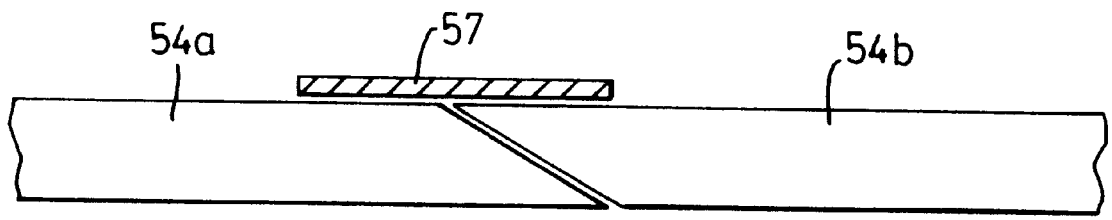

A further possibility, as seen in FIG. 11D is to fuse a thin jointing strip on one side of the thin, for example chamfered, overlap edge portions.

The integrity of the overlap fusion weld is affected by the degree of crosslinking of the polymer sheet 51. The techniques required to produce a fusion bond of acceptable strength are well known to those of ordinary skill in the art, and are discussed for example in Tailor U.S. Pat. No. 4,472,468, to which reference may be made for further details.

The fusion of the overlap is not restricted to direct welding of the sheet surfaces. Other conventional methods of effecting a bond may be employed, for example, placement of a medium between the overlapping portions of the sheet. This medium may be, for example, a high temperature adhesive, for example a crosslinked polyolefin adhesive, a polymeric film compatible with the material of the sheet and filled with conventional metallic and or magnetic fillers and that are responsive to induction heating coils such as the materials available under the trade marks HELLERBOND and EMABOND, polymeric films reinforced with resistive heating elements that can be activated by passage of an electric current, and compatible polymeric films filled with a crosslinking agent, for example dicumyl peroxide and that is heated, fused and cured.

If desired, in order to provide a composite member having an outer layer that itself comprises two or more layers, two or more heat shrinkable outer layers or sleeves such as sleeve 51 may be assembled around the inner layer or core 52 disposed on the mandrel 53, all these layers then being heated and bonded together in an oven or the like in the manner described above.

Figure 12:
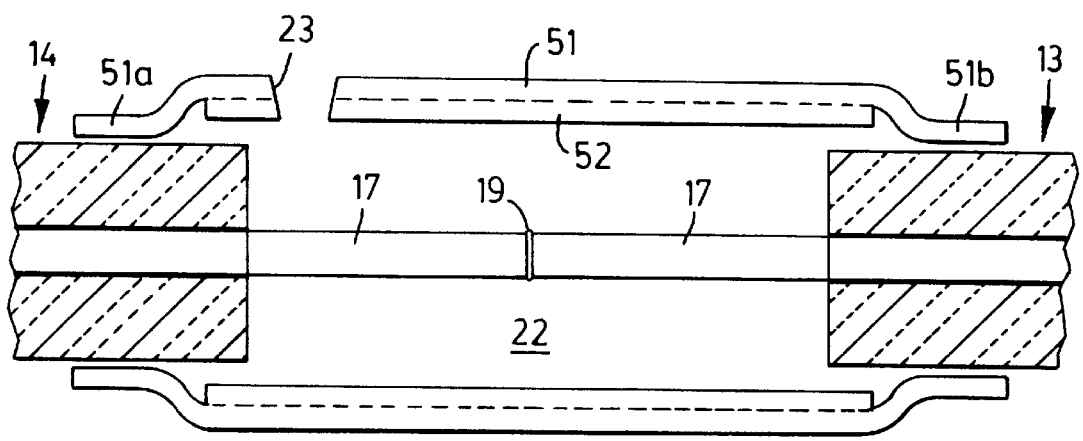
FIG. 12 is a side view, partially in section through the member of FIG. 7 used as a casing in forming a preinsulated pipeline joint.

The function of the inner core 52 is normally to provide additional thickness and mechanical strength to the middle portion of the casing member to resist the in-situ foaming pressure and subsequently provide mechanical protection to the film provided within the cavity 22, as seen in FIG. 12. The inner core 52 need not, therefore, have heat shrinkability although, as described above, if desired the inner core 52 in the finished composite sleeve member may be provided with a degree of heat shrinkability similar to that of the end portions 51a and 51b.

Various procedures may be employed for forming the inner core or layer 52. For example, the core 52 may be a tube which is extruded, blow molded or rotationally molded. Alternatively, the layer 52 may be formed from a sheet that is butt or overlapped welded to make a tube. The core 52 may also be formed in conventional manner by winding a multiplicity of turns of a thin sheet about a mandrel in a spiral wrapping. This spiral wrapping maybe pre-fused into a tube, but preferably the spiral wrapping is wound direct on the mandrel 53 over which the outer sleeve 51 is then placed and during the subsequent heat fusion, the spirally wrapped layers fuse together as well as fusing to the outer layer 51.

While, as noted above, the inner core 52 need not be heat shrinkable, it has been found to be advantageous to employ a core 52 that has a small amount of shrinkability, since this facilitates manufacture of the composite sleeve member.

When an inner core tube 52 or a spirally wrapped tube is placed on the mandrel 53, a slight degree of shrinkability, for example about 5% based on the length of the unshrunk sheet allows a good conformance to the mandrel 53. Preferably, once shrunk onto the mandrel 53 the core 52 is fully shrunk and does not exhibit further heat shrinkability.

Further, the material from which the core 52 is formed may preferably have a small amount of crosslink, for example about 15 to about 40% since this may facilitate shrinking and conformance of the core 52 to the mandrel. Equally satisfactory results are obtained, however, even in the absence of crosslinking if the sheet from which the inner core 52 is formed has sufficient negative extrusion orientation left in it.

Figure 14A:
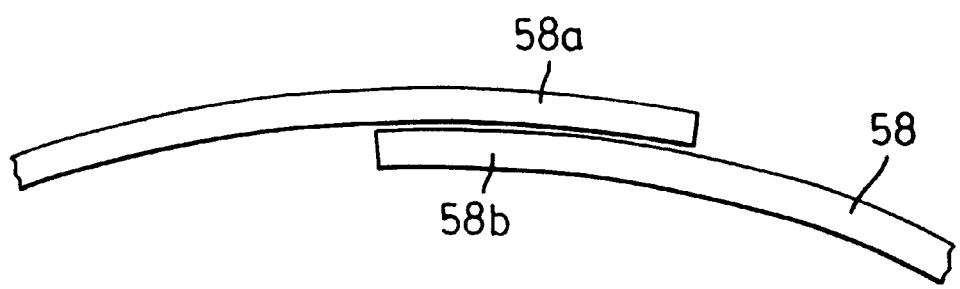
FIGS. 14A and 14B are partial transverse cross-section illustrating overlapping bonds employed in fabrication of an inner member of a preferred form of the casing.
Figure 14B:
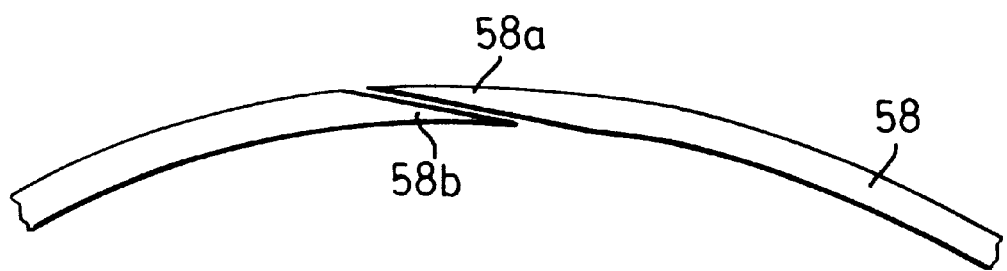

In the case in which the inner core 52 is formed by overlapping the edges 58a and 58b of a sheet 58, as illustrated in FIG. 14A, it is advantageous to chamfer the edges, for example, as shown in FIG. 14B in order to avoid pronounced steps or discontinuities in the inner and outer surfaces of the finished tube and to avoid any tendency for a longitudinal air channel to be formed adjacent the step or discontinuity.

Figure 15A:
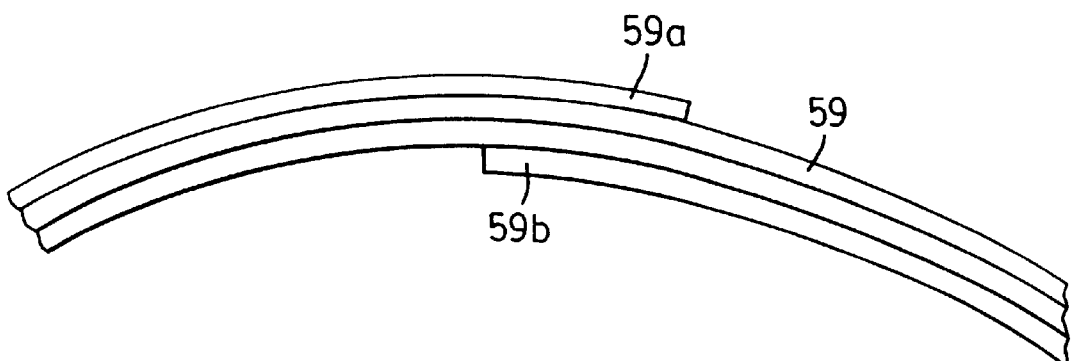
FIGS. 15a and 15B are partial transverse cross-sections illustrating formation of an inner core from multiple layer wrappings.
Figure 15B:
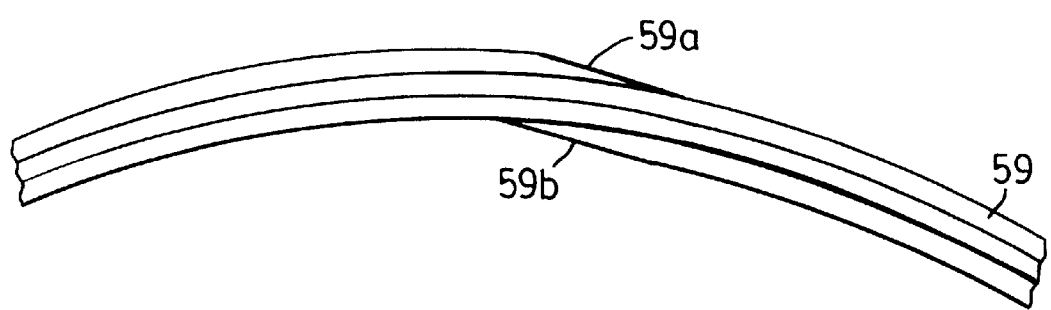

Similarly, when the inner core 52 is formed from a spirally wrapped sheet 59 as seen in FIG. 15A desirably the end edges 59a and 59b are chamfered, as seen in FIG. 15B.

As described above, examples suitable plastics materials from which the inner and outer layers 51 and 52 may be made are well known to those skilled in the art and need not be described in detail. Merely by way of example, in a particularly preferred form, the inner and outer layers 51 and 52 may be of polyethylene or a blend of polyolefins, or a blend of polyolefins with copolymers and/or elastomers.

An important advantage of the procedure for forming the casing member as a composite sleeve is that it allows the inner tube or core to be tailored to suit various functions or provide desired capabilities.

Figure 13:
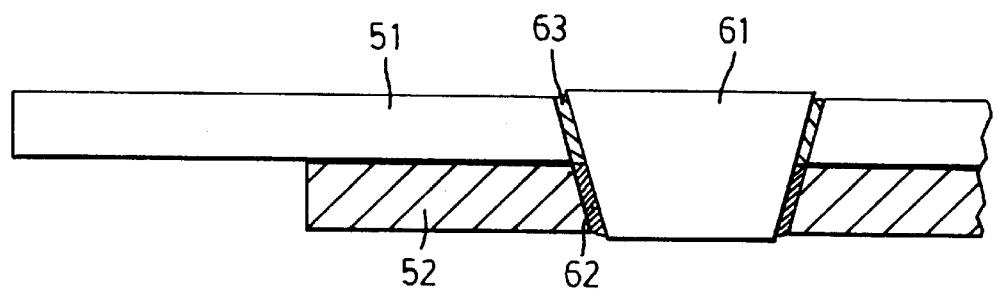
FIG. 13 is a partial longitudinal cross-section on an enlarged scale through a portion of the casing of FIG. 12 showing welding of a plug to a foam hole in the casing member.

For example, while the heat shrinkable outer layer 51 usually has a relatively high crosslink level, for example 40 to 100% by weight, the inner layer or core 52 may preferably be substantially uncrosslinked, or have a degree of crosslinking substantially less than that of the outer layer 51. For example, the inner layer 52 may have a degree of crosslinking of less than about 40%, more preferably less than about 25%. As a result, with reference to FIGS. 12 and 13, while the outer layer 51 generally has insufficient free mobile molecules available for heat fusing of a foam hole plug 61, there are sufficiently high quantities of free mobile molecule in the inner layer 52 to fuse to the plug 61, which is usually formed of a polymer similar to or compatible with the layers 51 and 52, and to provide an effective seal. As seen in FIG. 13, when heated in conventional manner, the plug 61 may form an excellent weld as indicated by the area 62 to the inner layer 52 and only a moderate weld as indicated by the area 63 to the crosslinked outer layer 51.

In a further example, the inner core 52 may be formed from a polymer reinforced with high modulus fibers, for example glass fibers, KEVLAR (Dupont), or the like, in order to obtain a higher flexural modulus. This allows the thickness of the inner core 52 to be reduced without compromising the mechanical integrity of the casing. The lower thickness of the composite inner core 52 reduces the weight of the casing member, and this is particularly significant in relation to large diameter casings.

In still a further example, the inner core 52 may be made from transparent material, for example cellulose acetate, cellulose acetate butyrate (UVEX, available from Eastman Chemicals), polyester (MYLAR, available from DuPont Co.), modified polystyrene, acrylic resin (PLEXIGLAS, available from Rohm & Haas), copolyester (KODAR, available from Eastman Kodak), polycarbonate (LEXAN, available from G.E. Plastics) and polyvinylchloride. These materials are given by way of example only, and other transparent polymers may, of course, be employed.

The advantage of providing a transparent casing is that it allows visual detection of defects that may be present in the foam, particularly air void. When such defects are detected, a repair can be carried out by drilling a hole and filling in with more foam.

Where such transparency is desired, the outer layer 51 is also formed from a transparent or semi-transparent polymer in order to facilitate visual inspection.

In a still further example, the inner core 52 may comprise a sleeve or tube or like structure fabricated from sheet metal, such as galvanized aluminium, galvanized sheet steel, or the like, in order to provide mechanical rigidity with reduced weight. The inner core may, of course, be constructed from a combination of various material, such as plastics, metals and the like.

Figure 16:
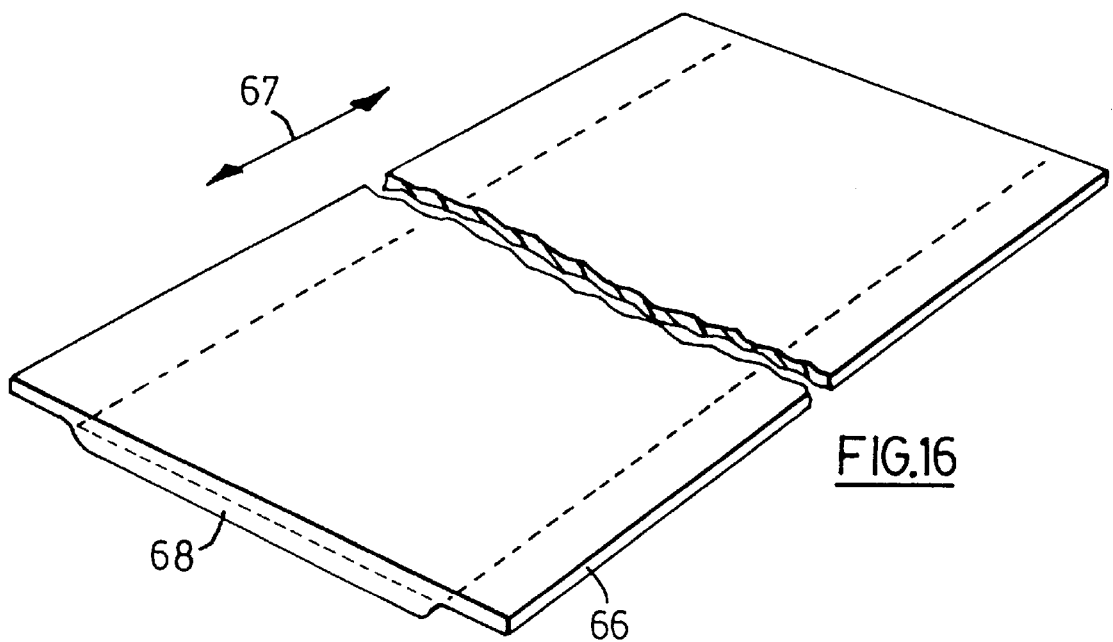
FIG. 16 shows a wraparound sleeve in accordance with the invention.

In a further procedure, the casing member may be formed as a sleeve derived from a sheet that is at least partially heat shrinkable along a heat shrink direction and that has edges opposed in the heat shrink direction connected together. For example, as illustrated in FIG. 16, a heat shrinkable sheet 66 that is heat shrinkable in the longitudinal direction, indicated by the arrow 67 in FIG. 16 may be provided. To a face of sheet 66 is laminated, by any conventional lamination technique, for example by extrusion lamination, a polymeric layer 68. The layer 68 may have any of the characteristics described above for the polymeric inner layer 52. For example, it may be a dimensionally heat stable layer of a lower degree of crosslinking than the sheet 66, or it may be a transparent layer, or a fiber reinforced layer or the like. In order to form the laminate into a casing member, edge portions that are opposed in the direction of the heat shrink axis 67 are overlapped and bonded together. Preferably, the edge portions are chamfered and bonded together using any of the procedures described above with reference to the bonding together of the edges of the sheet forming the sleeve 51. The layer 68 may be on the outer or on the inner side of the resultant sleeve.

In one advantageous form, longitudinally continuous sheets, for example of the general form seen in FIG. 16 are provided, from which lengths may be severed in the field according to the desired circumference of the sleeve form casing to be employed and formed into endless sleeves by bonding edge portions opposed in the heat shrink direction together. This has the advantage that sleeves of any desired circumference can be formed, matching the girth of the pipeline sections to be joined.

Some detailed examples of the casing members of the invention and of their methods of fabrication will now be given.

EXAMPLE 1

An 800 mm wide and 2.75 mm thick sheet was extruded for the outer sleeve using the following formulation:

Novacor HEY449A polyethylene 96% (Nova Chemicals)
Irganox 1010 Antioxidant 2% (Ciba Geigy) Carbon Black 2%

The sheet was crosslinked by electron beam radiation at a dosage of 8 Mrads and stretched by 35%. The sheet was cut to a layflat length of 630 mm, and two ends in the machine direction were chamfered in a width of 50 mm so that the edge was 0.013 mm thick. The chamfered areas were overlapped and welded together in a welding press to obtain a sleeve.

The inner sheet was made from the same formulation, but was 1.0 mm thick and 400 mm width. It was given a low radiation does of 3.0 Mrads, chamfered and made into a tube so that it fitted snugly on the mandrel diameter of 175 mm. The inner core was inserted on the mandrel and then the outer sleeve was centrally positioned over it, and the assembly was placed in an oven at 180° C. for the 30 minutes. Then, it was removed and cooled and the part was removed from the mandrel. Upon shrinking with a propane flame torch, the thinner end zones shrank first while the middle thick portion remained intact. But as more heat and time was given, the area adjacent to the thin zones also started to shrink down, but sluggishly.

EXAMPLE 2

The same outer sleeve material described in Example 1 was prepared into a welded tube.

A 500 mm long fiberglass reinforced polyester tube was snugly fitted over a mandrel of size 175 mm. Then the outer core of width 800 mm was centrally positioned over it and the assembly was placed in the oven and cooled as described in Example 1. The finished part was shrunk with a propane flame torch. The thinner end zones shrank preferentially, while the middle core remained unshrunk.

EXAMPLE 3

The procedure of Example 2 was followed. Instead of glass reinforced polyester, a sheet of galvanized aluminum of thickness of 0.25 mm was wrapped on the mandrel. The finished part showed the rigidity and shrinking performance of the parts made with 1 mm of polyethylene or the reinforced polyester inner core.

EXAMPLE 4

In this example, a semi-transparent heat shrinkable casing was made. The product configuration was similar to Example 1, except that the inner core was made from UVEX cellulose acetate butyrate from Eastman Chemical Product. This is a transparent sheet plastic. The outer core was made from a 1.00 mm thick heat shrinkable sheet using the following formula:

| Novacor HEY 449A | 50% (Nova Chemicals) |
| Elvax 1221 (Dupont) | 49% (Dupont) |
| Irganox 1010 | 1% (Ciba Geigy) |

The casing was fabricated as described in Example 1. The finished casing part was semi-transparent. The installation was carried out using a propane torch, and the ends shrank down well.

What is claimed is:

1. A casing member for forming a connection between tubular sections having respective end surfaces, the member having heat shrinkable end portions, for connecting on said respective adjacent end surfaces of said tubular sections, and a middle portion for spanning between said end surfaces of said tubular sections, said end portions formed integrally with at least a portion of the middle portion and comprising a zone having a relatively small wall thickness and the middle portion having a relatively large wall thickness, said zones of the end portions being caused to shrink while said middle portion remains unshrunk and remains solid and not melting or flowing when said zones and said middle portion are exposed to similar heat flux for a similar period of time.

2. A member according to claim 1 wherein the wall thickness of said zone is no more than 95% of the thickness of the middle portion.

3. A member according to claim 2 wherein the wall thickness of said zone is no more than 70% of the thickness of the middle portion.

4. A member according to claim 1 wherein each said zone of relatively small thickness extends 5 to 35% the length of the member.

5. A member according to claim 1 wherein each end portion is of substantially uniform thickness.

6. A member according to claim 1 wherein each end portion decreases in thickness longitudinally outwardly from the middle portion.

7. A member according to claim 1 comprising a tubular sleeve having a ratio of the wall thickness of its middle portion to the diameter of the middle portion in the range from 5:1 to 300:1.

8. A member according to claim 1 having a hole through the middle portion for introduction of a liquid precursor of a foam composition.

9. A member according to claim 1 wherein each end portion has a degree of shrinkage of 5 to 60% in circumference based on the circumference of the unshrunk end portion.

10. A member according to claim 9 wherein said middle portion comprises at least a first outer and a second inner layer bonded together, and each end portion is formed integrally with one of said layers.

11. A member according to claim 1 in the form of a wrap-around sleeve, the wrap-around sleeve comprising a sheet that is at least partially heat shrinkable along a heat shrink direction and that is, or of which sections are, adapted to be formed into the wrap-around sleeve by connecting together edges opposed in the heat shrink direction.

12. A member according to claim 11 wherein said sheet comprises a heat shrinkable first layer and a second layer laminated thereto and disposed inwardly from the margins of the first layer.

13. A member according to claim 12 wherein said second layer comprises fiber reinforced plastics material.

14. A member according to claim 1 comprising a first outer layer including said end portions in the form of a sleeve heat shrunk into conformity with a second inner layer and bonded thereto.

15. A casing member for forming a connection between tubular sections comprising a tubular sleeve having end zones, and wherein at least said end zones are heat shrinkable, said sleeve comprising first and second coaxial plastic sleeve portions bonded together, wherein the second plastic sleeve portion has a degree of crosslinking substantially less than the first plastic sleeve portion, and said tubular sleeve having a hole through said first and second plastic sleeve portions for introducing a liquid precursor of a foam composition to the interior of the tubular sleeve.

16. A member according to claim 15 wherein said second portion comprises plastics material that is uncrosslinked, or crosslinked to an extent of less than 40%.

17. A member according to claim 10 wherein said inner and outer layers each comprise transparent or semi-transparent plastics material.

18. A member according to claim 10 wherein said inner layer comprises fiber reinforced plastics material, sheet metal or a combination thereof.

19. A member according to claim 10 wherein said layers are bonded by fusion or by an adhesive agent.

20. A member according to claim 14 wherein said sleeve comprises a sheet heat shrinkable along a heat shrink direction and having edges that are opposed in the shrink direction bonded together at overlap portion, the thickness of which is not more than 80% thicker than the thickness of the remainder of the sheet.

21. A method of forming a composite sleeve member having heat shrinkable end portions comprising disposing an inner covering member on a mandrel, disposing around the inner member and mandrel a sleeve formed from a sheet that is heat shrinkable in the circumferential direction, said sheet having edge portions and said edge portions of the sheet being bonded together at an overlap portion, said sleeve extending beyond either end of the inner member, shrinking the sleeve to conform to the inner member and mandrel, bonding the shrunk sleeve to the inner member to form a composite sleeve member, and removing the composite sleeve member from the mandrel.

22. A method of forming a composite sleeve member for forming a connection between tubular sections, having heat shrinkable end portions comprising providing a first layer that is heat shrinkable in a heat shrink direction, laminating a second layer to the first layer to form a laminate wherein the second layer has sides disposed inwardly from the margins of the first layer and wherein said laminate has edge portions that are spaced apart in the heat shrink direction, and bonding said edge portions together at an overlap portion, said second layer remaining solid and not melting or flowing at the temperature at which the end portions commence heat shrinking during the forming of said connection.

23. A method according to claim 22 wherein said edge portions of said sheet or first layer are reduced in thickness at least in the portions adjacent the end portions of the sleeve whereby the thickness of the overlap portions where bonded is not more than 80% thicker than the thickness of the remainder of the sheet or first layer.

24. A method according to claim 23 wherein said reduced thickness edge portions are chamfered.

* * * * *